United States Patent
Heinle et al.

[11] Patent Number: 5,992,162
[45] Date of Patent: Nov. 30, 1999

[54] PROCESS FOR THE OUTSIDE-MOISTURE-DEPENDENT CONTROL OF A MOTOR VEHICLE AIR CONDITIONER

[75] Inventors: Dieter Heinle, Pluederhausen; Wolfgang Volz, Magstadt, both of Germany

[73] Assignee: DaimlerChrysler AG, Stuttgart, Germany

[21] Appl. No.: 09/105,977

[22] Filed: Jun. 29, 1998

[30] Foreign Application Priority Data

Jun. 27, 1997 [DE] Germany ............... 197 27 323

[51] Int. Cl.⁶ ................... B60S 1/02; B60S 1/54
[52] U.S. Cl. .............. 62/90; 15/250.001; 165/204; 454/121
[58] Field of Search ............ 62/90; 454/75, 454/85, 93, 121, 127; 165/204; 236/91.6; 15/250.001

[56] References Cited

FOREIGN PATENT DOCUMENTS

| | | |
|---|---|---|
| 36 24 171 A1 | 1/1988 | Germany . |
| 38 36 559 A1 | 5/1990 | Germany . |
| 39 30 853 A1 | 3/1991 | Germany . |
| 43 16 557 A1 | 11/1994 | Germany . |

*Primary Examiner*—William Wayner
*Attorney, Agent, or Firm*—Evenson, McKeown, Edwards & Lenahan, PLLC

[57] ABSTRACT

A process for the outside-moisture-dependent control of an air conditioner of a motor vehicle equipped with a window wiper system provides that at least one air conditioner component is controlled as a function of a window wiper activation signal for reducing the fogging-up of the windows. The simultaneous use of such a signal, on the one hand, for the operating of window wipers and, on the other hand, as a signal for recognizing moist or wet weather by means of the air conditioner permits the automatic adjustment of an operating condition of the air conditioner by simple means. This avoids or reduces the fogging-up of the vehicle windows.

6 Claims, 1 Drawing Sheet

PROCESS FOR THE OUTSIDE-MOISTURE-DEPENDENT CONTROL OF A MOTOR VEHICLE AIR CONDITIONER

BACKGROUND AND SUMMARY OF THE INVENTION

This application claims the priority of German patent application No. 197 27 323.8, filed Jun. 27, 1997, the disclosure of which is expressly incorporated by reference herein.

The invention relates to a process for the outside-moisture-dependent control of an air conditioner of a motor vehicle equipped with a window wiper system.

It is known to control motor vehicle window wiper systems as a function of the outside moisture, that is, as a function of the air moisture (humidity) of the exterior space from which air is taken in for air-conditioning the vehicle interior, particularly for avoiding a fogging-up of vehicle windows. In the situation where an air conditioner is equipped with a refrigerant circulating system having an evaporator and a compressor, when a high air moisture is recognized in the exterior space, for this purpose the air taken in from the exterior space and blown into the interior is cooled in a so-called reheat operation on the cold evaporator. This is so that the moisture condenses on the evaporator and the air is therefore dried and subsequently heated again to the required blow-out temperature. The air current, which is dried in this manner, is then preferably aimed in the direction of the vehicle windows which are to be protected from fogging up, particularly by way of a so-called defroster air duct in the direction of the windshield.

In contrast, in other situations, for example, in the heating operation of the air conditioner, another type of air conditioning and air current guiding is desirable for the air to be blown out into the vehicle interior. Thus, in the heating operation, the air is preferably blown out by way of leg space air ducts and, at most very slightly, by way of the defroster air ducts. Also, when the weather conditions are dry, the amount of air blown in the direction of the vehicle windows does not have to be very large. Hence, the delivery output of a corresponding air blower and thus the noises caused by it can be reduced.

In the case of known simple automatic operating methods of motor vehicle air conditioners, basic ventilation is therefore provided by means of the blower whose intensity is not completely designed according to the least favorable case of a high tendency of the windows to fog up, that is, moist or wet weather, but as a compromise between the various weather conditions, acceptable sound effects and comfortable adjustments with respect to the air output, that is, as a middle course between the normal air-outlet action in the defroster operation, on the one hand, and a pure leg space ventilation, on the other hand. As a result, in the case of these simpler conventional automatic air-conditioning systems, there is the danger that, in the event of unfavorable weather conditions, particularly in the event of rain, in the automatic air-conditioning operating phases, the windows may fog up at least partially and require manual control interventions.

As a remedy, it is known to provide so-called moisture or dew point sensors in order to determine the air moisture or the dew point temperature in the exterior space and, optionally also in the vehicle interior. As a function thereof, the air conditioner is automatically controlled such that a fogging-up of the windows is avoided.

Thus it is known from German Published Patent Application DE 43 16 557 A1 to use the output signal of a sensor system for detecting the degree of thawing or icing on a vehicle window, for example, for the automatic control of a window wiper system, but mainly of an air conditioner. For this purpose, a special sensor system for sensing the degree of thawing or icing and a control of the opening degree of an air flap of the air conditioner and, optionally, also an assembly pertaining to the air conditioner are suggested. This assembly dehumidifies the air to be blown into the interior as a function of the output signal of this sensor system. Other air conditioners with humidity and/or dew point sensor systems and an air-conditioner control as a function of their output signals are disclosed in German Published Patent Application DE 36 24 171 A1 and German Patent Document DE 38 36 559 A1. The implementation of moisture and dew point sensors is connected with corresponding increased expenditures.

For motor vehicles which have a window wiper system, as in particular virtually all of today's automobiles, it is known to provide a manually operable window wiper switch which, in a corresponding switch position, emits a window wiper activation signal which causes a pertaining window wiper control to activate the window wipers. Furthermore, window wiper systems with an automatic wiper activation are known which have a so-called rain sensor by which precipitation, particularly rain, can be recognized on the vehicle windows. When the rain sensor detects precipitation, it emits a wiper activation signal which causes the wiper control to carry out an automatic activation of the window wipers.

From German Published Patent Application DE 39 30 853 A1, a process is known for ventilating a vehicle interior using a ventilating device which can be switched between incoming air and circulating air operation as a function of the output signal of a sensor detecting the pollutant content of the outside air. In this case, the sensitivity of the pollutant sensor is set as a function of a one-step or multi-step wiper activation signal emitted by a window wiper switch. In particular, it is provided to set the sensitivity of this sensor lower in the event of the presence of the wiper activation signal while its activation intensity rises. This has the purpose of preventing an unintentional switching to the circulating air operation in the event of a suddenly occurring rain in the summer which could otherwise occur because the used pollutant sensor reacts to the occurring moisture as if pollutants were present.

The present invention is based on the technical problem of providing a process of the above-mentioned type by which, in moist or wet weather, particularly in the event of precipitation, an air conditioner can automatically be controlled at comparatively low costs such that the fogging tendency of the windows which is threatened in these situations will be counteracted.

The present invention solves this problem by providing a process for the outside-moisture-dependent control of an air conditioner of a motor vehicle equipped with a window wiper system. The output of an air blower is controlled as a function of the presence of a window wiper activation signal for reducing the fogging-up of the windows such that, in the event of the presence of a window wiper activation signal, it is operated at a higher basic output level than when no window wiper activation signal is present. Furthermore, the opening ratio of a defroster air duct, as a function of the presence of a window wiper activation signal, is controlled in a manner which reduces the fogging-up of the window such that, in the event of the presence of the window wiper activation signal, it is selected to be larger than in the absence of the window wiper activation signal by an amount defined as a function of the vehicle interior ventilation temperature.

In the case of this process according to the invention, an air blower or a defroster air duct of the air conditioner is controlled in a manner which reduces the fogging-up of the windows as a function of a window wiper activation signal. The wiper activation signal, generated manually or automatically within the widow wiper system of the motor vehicle in the event of occurring precipitation, particularly rain, for the purpose of activating the wipers, is therefore simultaneously used for controlling the concerned air conditioner component such that such fogging-up of the vehicle windows, particularly of the windshield, which threatens particularly in such moist or wet weather, is prevented or at least reduced. The implementation of high-expenditure moisture and/or dew point sensors specifically for the air conditioner can therefore be eliminated. The signal of a rain sensor or of a manually operable window wiper switch can be used as the wiper activation signal.

In a preferred embodiment, the present invention specifically provides a control of the air blower output such that, in the event of the presence of a window wiper activation signal, a higher basic delivery level is selected than when there is no window wiper activation signal. This increases the air delivery output of the air conditioner, specifically in the operating condition with an approximately adjusted vehicle interior temperature.

In the process according to a further preferred embodiment, especially the opening ratio of the defroster air duct in the event of the presence of a wiper activation signal is selected to be larger than when there is no wiper activation signal by an amount which is defined as a function of the vehicle interior ventilation temperature. This, in particular, permits a varying increase of the opening ratio in the event of an occurring wiper activation signal according to the vehicle interior temperature. For example, it may be provided to raise the opening ratio only above a certain ventilating temperature limit value, in which case the amount of the rise, in turn, can be defined to be increasing with a rising ventilation temperature.

Other objects, advantages and novel features of the present invention will become apparent from the following detailed description of the invention when considered in conjunction with the accompanying drawings.

DETAILED DESCRIPTION OF THE DRAWINGS

Figure 1:
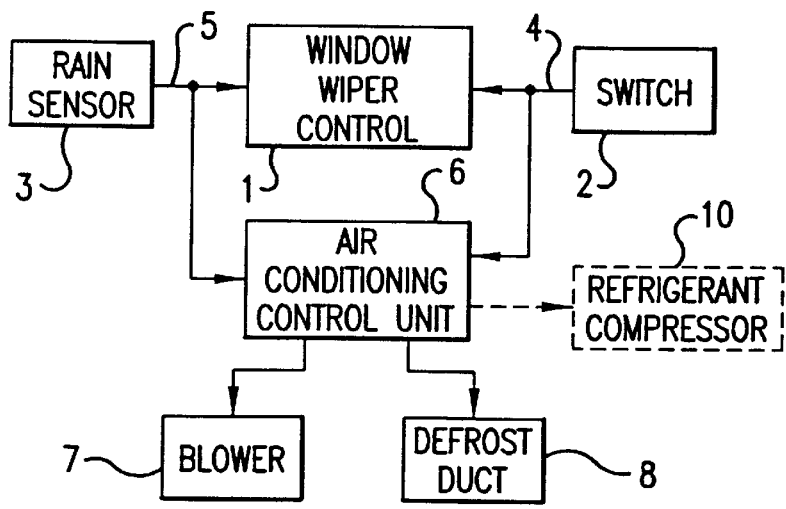
FIG. 1 is a block diagram of components of an air conditioner which are of interest in this case and of a window wiper system of a motor vehicle.

FIG. 1 shows as a block diagram the components of an air conditioner which are of interest here as well as a window wiper system of a motor vehicle, for example, a passenger car or a utility vehicle. As known per se in modern automobiles, the window wiper system contains a window wiper control 1 for controlling a window wiper motor system (which is not shown) and which, in turn, operates one or several window wipers (not shown), as well as a manually operable window wiper switch 2 and a conventional rain sensor 3. By operating the window wiper switch 2 from an off-position to an on-position,—in which case, usually several on-positions are provided for different wiper frequencies—, the window wiper switch 2 emits as an output signal 4 a manual wiper activation signal to the window wiper control 1, which then triggers the window wiper motor system to actively operate the widow wiper or wipers. In this case, the output signals 4, 5 of the window wiper switch 2 and of the rain sensor 3 can be guided by means of a direct cabling or by means of a signal transmission by way of a data bus to the air conditioner control unit 6. The rain sensor 3 is arranged at a point suitable for this purpose, for example, on the top side of the windshield in the area of the mirror base such that it can detect occurring precipitation, particularly rain. When it detects such precipitation, it emits as an output signal 5 an automatic window wiper activation signal to the window wiper control 1 which then causes an automatic operation of the window wipers. In addition, the window wiper system has a so-called washer-wiper switch, which is not shown, and upon whose activation, a washing liquid is automatically sprayed onto the wipable exterior side of the window, and the window wipers are operated for cleaning the respective window surface for a defined time period, typically for a few washing cycles.

The air conditioner is also of a conventional construction, FIG. 1 explicitly illustrating an air conditioner control unit 6, an air intake blower 7 controlled by it, and a defroster air duct 8 which contains a defroster air flap which can be controlled by the air conditioner control unit 6. Furthermore, the air conditioner contains additional conventional components which are not of interest here, such as a refrigerant circulating system with an evaporator and a compressor for the appropriate conditioning of the air flow taken in by the blower 7 from the exterior space, as well as additional air ducts for blowing out the conditioned air current into the vehicle interior at several points.

Characteristically, in the case of the system of FIG. 1, the output signal 4 of the window wiper switch 2 and the output signal 5 of the rain sensor 3 are supplied not only to the window wiper control 1 but also to a respective input of the air conditioner control unit 6. It is understood that, as required, the window wiper control 1 and the air conditioner control unit 6 can be formed by a single control unit to which the window wiper switch output signal 4 and the rain sensor output signal 5 are supplied. In the case of the system of FIG. 1, it is also characteristic that the blower 7 and the defroster air duct 8, more precisely, its air flap which is adjustable for changing the opening ratio of the defroster air duct, are controlled by the air conditioner control unit 6 as a function of the window wiper output signal 4 and of the rain sensor output signal 5. The controlling takes place such that it counteracts a tendency of the windows to fog up during wet weather. This characteristic measure is based on the fact that the window wiper activation signal automatically emitted by the rain sensor 3 as well as the widow wiper activation signal emitted as the result of the corresponding manual operation of the switch 2 are a reliable indication that moist or wet weather exists in the exterior space during which there is the danger of having the windows fog up. A possible control scheme is shown in detail in FIGS. 2 and 3.

Figure 2:
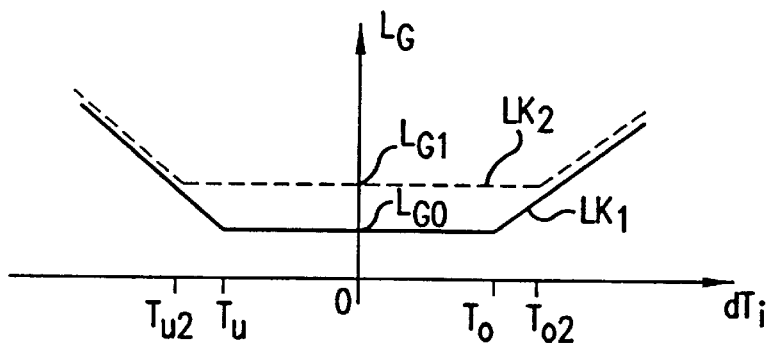
FIG. 2 is a diagram illustrating the characteristic curves of an air conditioner air blower of FIG. 1 in dry weather, on the one hand, and in wet weather, on the other hand.

In a qualitative manner, FIG. 2 shows the characteristic curves of the output $L_G$ of the blower 7 as a function of the deviation $dT_i$ of the vehicle interior temperature, that is, of the difference between its actual and its desired value. In this case, a first continuously drawn line $LK_1$ relates to the situation in which a respective manual or automatic window wiper activation signal is not emitted by either the window wiper switch 2 or by the rain sensor 3. In this normal condition in which the weather is dry and the operation of the window wiper is not required, the blower output $L_G$ is set to a basic output level $L_{G0}$ within a certain tolerance range of the vehicle interior temperature control difference $dT_i$, which ranges about the zero value between a negative lower limit value $T_u$ and a positive upper limit value $T_o$. From this basic output level $L_{G0}$, the blower output $L_G$ rises in a linear manner toward both sides according to the characteristic curve $LK_1$ until a maximal blower output is reach which is no longer of interest here and will therefore not be shown. That is to say, the blower output $L_G$ rises in a linear manner in the case of a vehicle interior temperature deviation $dT_i$ falling below the lower limit value $T_u$ in the heating operation, as well as in the case of the deviation $dT_i$ rising above the upper limit value $T_o$ in the cooling operation.

As soon as the window wiper activation signal is emitted by the window wiper switch 2 as an output signal 4, or by the rain sensor 3 as an output signal 5, the air conditioner control unit 6 will no longer set the output of the blower 7 by means of the characteristic curve $LK_1$ for dry weather but according to a second characteristic curve $LK_2$ which is indicated by a broken line in FIG. 2 and which therefore applies to the case of moist or wet weather. The characteristic blower output curve $LK_2$ for this case of wet weather is characterized particularly in that the basic output level, which applies to the condition of the adjusted vehicle interior temperature, that is, when the vehicle interior temperature deviation $dT_i$ within an interval $[T_{u2}, T_{o2}]$ is around the zero deviation, is set to a higher value $L_{G1}$ than the basic output level value $L_{G0}$ in the adjusted vehicle interior temperature control condition during dry weather.

This has the result, that, in wet weather, the air conditioner desirably blows a comparatively larger amount of air into the vehicle interior also when the vehicle interior temperature is adjusted, which air is preferably aimed in a targeted manner in the direction of the inside surfaces of the windows, for example, above the defroster air duct 8 in the direction of the interior surface of the windshield, which counteracts the fogging-up tendency of the concerned windows. Outside the deviation interval $[T_{u2}, T_{o2}]$ defining the adjusted vehicle interior temperature control condition, the blower output $L_G$ rises analogously to the case of dry weather also according to the characteristic curve $LK_2$ applicable to this weather to the outside on both sides, in a linear manner, that is in the heating operation as well as in the cooling operation. In this case, only because the basic output level $L_{G1}$ is raised with respect to the basic output level $L_{G0}$ in the case of dry weather, the interval $[T_{u2}, T_{o2}]$ of the adjusted vehicle interior temperature condition during wet weather is slightly enlarged with respect to that $[T_u, T_o]$ in dry weather.

Figure 3:
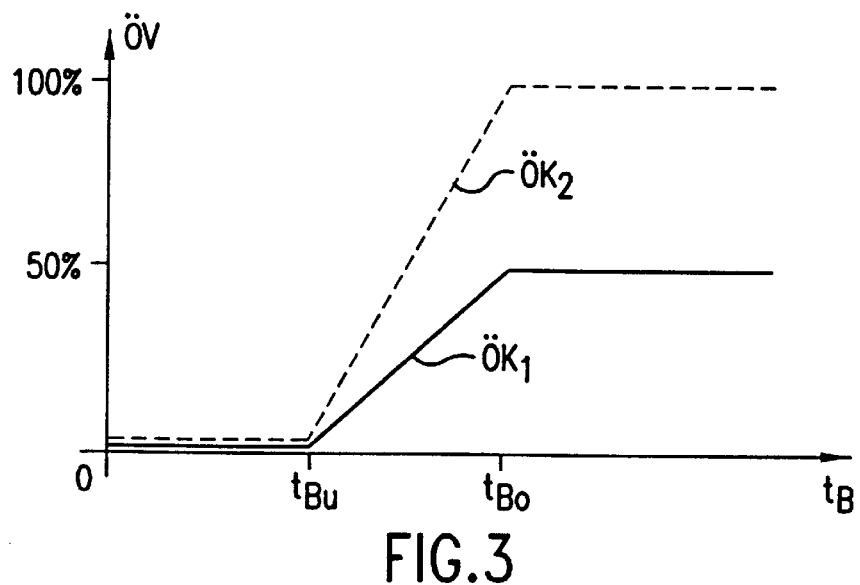
FIG. 3 is a diagram illustrating characteristic curves of the opening ratio of a defroster air duct of FIG. 1 in dry weather, on the one hand, and wet weather, on the other hand.

As a second outside-moisture-dependent measure, the air conditioner control unit 6 increases the opening ratio of the defroster air flap arranged in the defroster air duct 8, as illustrated in FIG. 3 which diagrammatically reflects the opening ratio ÖV of this flap as a function of the vehicle interior ventilation temperature $t_B$. In the operation without an existing window wiper activation signal from the window wiper switch 2 or from the rain sensor 3, the opening ratio of the defroster air flap is set according to a first characteristic curve $ÖK_1$ which is drawn by a solid line and according to which the opening ratio is close to zero as long as the ventilation temperature $t_B$ has not exceeded a defined lower limit value $t_{Bu}$. Between this lower limit value $t_{Bu}$ and an upper limit value $t_{Bo}$, the opening ratio will then rise linearly according to this characteristic curve ÖK, to an opening ratio of 50% which is maximal in this operation and which will then be maintained also in the case of a further increased ventilation temperature $t_B$.

If, in contrast, the window wiper activation signal is emitted by the window wiper switch 2 as its output signal 4 or by the rain sensor 3 as its output signal 5, the air conditioner control unit 6 controls the opening ratio of the defroster air flap according to a characteristic curve $ÖK_2$ illustrated by a broken line in FIG. 3. According to this characteristic curve $ÖK_2$, the opening ratio rises from the lower ventilation temperature limit value $t_{Bu}$ to the upper limit value $t_{Bo}$ in a linear manner to the theoretical maximum value of 100%, at which it will then remain with a rising ventilation temperature $t_B$. This means that, in rain or comparable moist or wet weather conditions, the air conditioned by the air conditioner is preferably blown by way of the defroster air duct 8 which, on the end side, is equipped with a conventional defroster nozzle, to the interior side of the windshield so that any fogging-up of this windshield can be reliably prevented there automatically without the requirement of manual interventions in the air conditioner by the vehicle occupants.

Thus, by means of the control measures for the blower 7 and the defroster air duct 8 illustrated in FIGS. 2 and 3, as the result of the utilization of a window wiper activation signal of the window wiper system, the undesirable fogging-up of vehicle windows, particularly of the windshield, can automatically be avoided by comparatively simple means. Simultaneously, for the case of drier weather, a lower blower output and thus lower blower noises are achieved as well as a desirably lower air flow proportion by way of the defroster air duct.

Preferably it is also provided in a manner not shown in detail that the air conditioner control unit 6 also controls the driving power for the refrigerant compressor 10 and as a result the drying power on the evaporator as a function of the presence of a window wiper activation signal from the window wiper switch 2 or from the rain sensor 3. In the operating situations in which, only because of the temperature ratios between the exterior space and the vehicle interior, no cooling is required of the air taken in from the exterior space and blown into the vehicle interior, the compressor can then be activated in a targeted manner in the event of the presence of a window wiper activation signal from the window wiper switch or from the rain sensor 3, while it otherwise may remain switched off which minimizes the energy consumption of the system. An excessive air cooling on the evaporator can optionally be compensated by reheating.

The above description of an advantageous embodiment demonstrates that the process according to the invention permits an outside-moisture-dependent control of a motor vehicle air conditioner merely by means of signals existing in any event for a window wiper system and therefore by very simple means without the requirement of special moisture or dew point sensors. The outside-moisture-dependent control prevents an undesired fogging-up of the vehicle windows in a sufficient manner. It is understood that the process is also suitable for motor vehicles whose window wiper system contains no rain sensor. In this case, only the output signal 4 of the window wiper switch 2 is supplied to the air conditioner control unit 6 for recognizing the presence or absence of a corresponding window wiper activation signal. It is understood that the output signal of the wiper-washer switch of the window wiper system is not supplied to the air conditioner control unit 6 or at least is not interpreted by it as a window wiper activation signal indicating the presence of moist or wet weather. It is also understood that, in the case of the customary several on-positions of the window wiper switch 2, already a first interval switching step, in which the wipers wipe only slowly at defined intervals, is used as a window wiper activation signal according to the invention for the control of the air conditioner which reduces the fogging-up of the windows.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for outside-moisture-dependent control of an air conditioner of a motor vehicle equipped with a window wiper system, the process comprising the acts of:

controlling an output of an air blower as a function of a presence or absence of a window wiper activation signal for reducing fogging-up of windows in the motor vehicle;

wherein said controlling act operates the air blower at a higher basic output level in the event of the presence of the window wiper activation signal than when the window wiper activation signal is absent;

controlling an opening ratio of a defroster air duct as a function of the presence or absence of the window wiper activation signal in a manner to reduce the fogging-up of the window;

wherein said controlling act for the opening ratio of the defroster air duct selects a larger opening ratio in the event of the presence of the window wiper activation signal than in the absence of the window wiper activation signal by an amount defined as a function of a vehicle interior ventilation temperature.

2. A process for outside-moisture-dependent control of an air conditioner of a motor vehicle equipped with a window wiper system, the process comprising the acts of:

controlling an output of an air blower as a function of a presence or absence of a window wiper activation signal for reducing fogging-up of windows in the motor vehicle;

wherein said controlling act operates the air blower at a higher basic output level in the event of the presence of the window wiper activation signal than when the window wiper activation signal is absent; and wherein when the air conditioner of the motor vehicle is not operating, the process comprises the act of activating a refrigerant compressor of the air conditioner as a function of the presence or absence of the window wiper activation signal.

3. An apparatus for reducing fogging-up of windows in a motor vehicle, the apparatus comprising:

an air conditioner control unit in the motor vehicle;

a window wiper system in the motor vehicle;

an air blower receiving an input signal from the air conditioner control unit;

at least one of a window wiper switch and a rain sensor, said window wiper switch and said rain sensor providing a window wiper activation signal for operating the window wiper system; and wherein said window wiper activation signal of said window wiper switch and said rain sensor is also provided to the air conditioner control unit such that, said air conditioner control unit controls the air blower as a function of the presence or absence of the window wiper activation signal by operating the air blower at a higher basic output level when the window wiper activation signal is present to reduce the fogging-up of the windows.

4. The apparatus according to claim 3, further comprising:

a defroster air duct having an opening ratio defined by a defroster air flap arranged in the defroster air duct, said defroster air duct receiving an input signal from the air conditioner control unit; and wherein said air conditioner control unit controls the opening ratio of the defroster air duct as a function of the presence of the window wiper activation signal such that the opening ratio of the defroster air duct is selected to be larger when the window wiper activation signal is present than when the window wiper activation signal is absent.

5. The apparatus according to claim 4, wherein the opening ratio of the defroster air duct is selected to be larger by an amount defined as a function of a vehicle interior ventilation temperature.

6. The arrangement according to claim 3, further comprising:

a refrigerant compressor receiving an input signal from the air conditioner control unit; and wherein when the air conditioner of the motor vehicle is not operating, said air conditioner control unit activates the refrigerant compressor as a function of the presence or absence of window wiper activation signal.

* * * * *